United States Patent
Hansen et al.

(10) Patent No.: US 8,972,865 B2
(45) Date of Patent: Mar. 3, 2015

(54) METHOD AND DEVICE FOR PROVIDING EASY ACCESS TO PRE-SELECTED DATA RESOURCES

(75) Inventors: Trond Werner Hansen, Horten (NO); Petter Nilsen, Oslo (NO); Johan Helloy Borg, Oslo (NO); Huib Kleinhout, Lorenskog (NO)

(73) Assignee: Opera Software ASA, Oslo (NO)

( * ) Notice: Subject to any disclaimer, the term of this patent is extended or adjusted under 35 U.S.C. 154(b) by 1629 days.

(21) Appl. No.: 11/976,086

(22) Filed: Oct. 19, 2007

(65) Prior Publication Data
US 2009/0106698 A1 Apr. 23, 2009

(51) Int. Cl.
*G06F 3/00* (2006.01)
*G06F 17/30* (2006.01)

(52) U.S. Cl.
CPC .... *G06F 17/30905* (2013.01); *G06F 17/30884* (2013.01)
USPC ......................................................... 715/739

(58) Field of Classification Search
USPC .................. 715/739, 745, 747, 838, 738, 740
See application file for complete search history.

(56) References Cited

U.S. PATENT DOCUMENTS

| | | | |
|---|---|---|---|
| 6,243,091 B1 * | 6/2001 | Berstis .......................... | 715/839 |
| 6,667,751 B1 * | 12/2003 | Wynn et al. ................... | 715/833 |
| 8,041,701 B2 * | 10/2011 | Amato et al. ................. | 707/707 |
| 2003/0079179 A1 * | 4/2003 | Brown et al. ............... | 715/501.1 |
| 2004/0049541 A1 | 3/2004 | Swahn | |
| 2006/0224997 A1 * | 10/2006 | Wong et al. ................... | 715/838 |
| 2008/0301555 A1 * | 12/2008 | Vartiainen et al. ............ | 715/704 |

OTHER PUBLICATIONS

Reimer, J. "Opera releases 9.2 browser, adds "Speed Dial"", Internet Citation, [Online], Apr. 12, 2007, p. 1, XP002514710.
Kaasten, S. et al., "Designing an Integrated Bookmark/History System for Web Browsing", Proceedings Western Computer Graphics Symposium, Mar. 1, 2000, pp. 1-4, XP008031090.
Lawton, G., "These Ae Not Your Father's Widgets", Computer, Jul. 1, 2007, pp. 10-13, 40(7), IEEE Service Center, Los Alamitos, CA, US, XP011189983.
"PC Magazine's FavOrg v1.0", Apr. 10, 2000, Internet Citation, [Online], XP002149773.

* cited by examiner

*Primary Examiner* — Thanh Vu
(74) *Attorney, Agent, or Firm* — Birch, Stewart, Kolasch & Birch, LLP

(57) ABSTRACT

The present invention is directed toward a computer implemented method and device for providing a user with easy access to a plurality of frequently accessed resources. The invention provides a user agent (e.g., web browser) in which certain data resources (e.g., web pages) are displayed as thumbnail images within particular locations of a window. A user invocable instruction (e.g., mouse click or a particular keystroke combination) may be associated with each of the thumbnail images or locations in the window. Accordingly, the user may access a desired data resource by performing the user invocable instruction associated with the corresponding thumbnail image or location.

18 Claims, 4 Drawing Sheets

METHOD AND DEVICE FOR PROVIDING EASY ACCESS TO PRE-SELECTED DATA RESOURCES

FIELD OF THE INVENTION

The invention relates generally to computer resource access, and more particularly to resource and document access from a user agent such as a web browser.

BACKGROUND OF THE INVENTION

Computer users typically use user agent applications such as web browsers to access documents and other resources that are available over a computer network to which their computer is connected. Such resources are identified by a Uniform Resource Identifier (URI), usually a Uniform Resource Locator (URL), which identifies the resource uniquely and provides the information necessary for locating and accessing the resource.

Current browsers maintain a list of bookmarks or favorites in which users can save the URLs of web pages they want to revisit. The bookmarks are usually saved in a more or less hierarchically structured manner, sorted by category. In addition, users can select a home page (start page), which will be loaded when the browser starts. This can typically be a portal, a search engine, or a favorite site.

Most users tend to visit only a few sites regularly, and a hierarchical system of a large number of web pages is inefficient in day to day browsing. Similarly, a single start page may bring a user to one favorite site, but if the user wants to visit a handful of sites in addition to the selected home page using current browsers, he or she will have to resort to either navigating through the bookmark list or entering the URL (or at least the beginning of the URL) in the browser's address field.

SUMMARY OF THE INVENTION

The present invention is directed toward a computer implemented method and a device for providing a user with easy access to a plurality of frequently accessed resources. The invention provides the user with a user interface where certain data resources, such as web pages, are represented as thumbnails in a browser window and accessible through a user invocable instruction. The user invocable instruction may be, e.g., a mouse click or a keystroke combination.

DETAILED DESCRIPTION

The present invention is directed toward a computer implemented method and a device for providing a user with easy access to frequently accessed documents. The method may typically be implemented as part of a user agent, e.g. a web browser, for providing the user with a representation of a limited number of preferred web pages or similar resources. Each representation may be associated with a web page such that when the user performs an action that signifies a selection of the representation (e.g. clicks on it with a mouse), the user agent is instructed to retrieve and display the resource.

Figure 1:
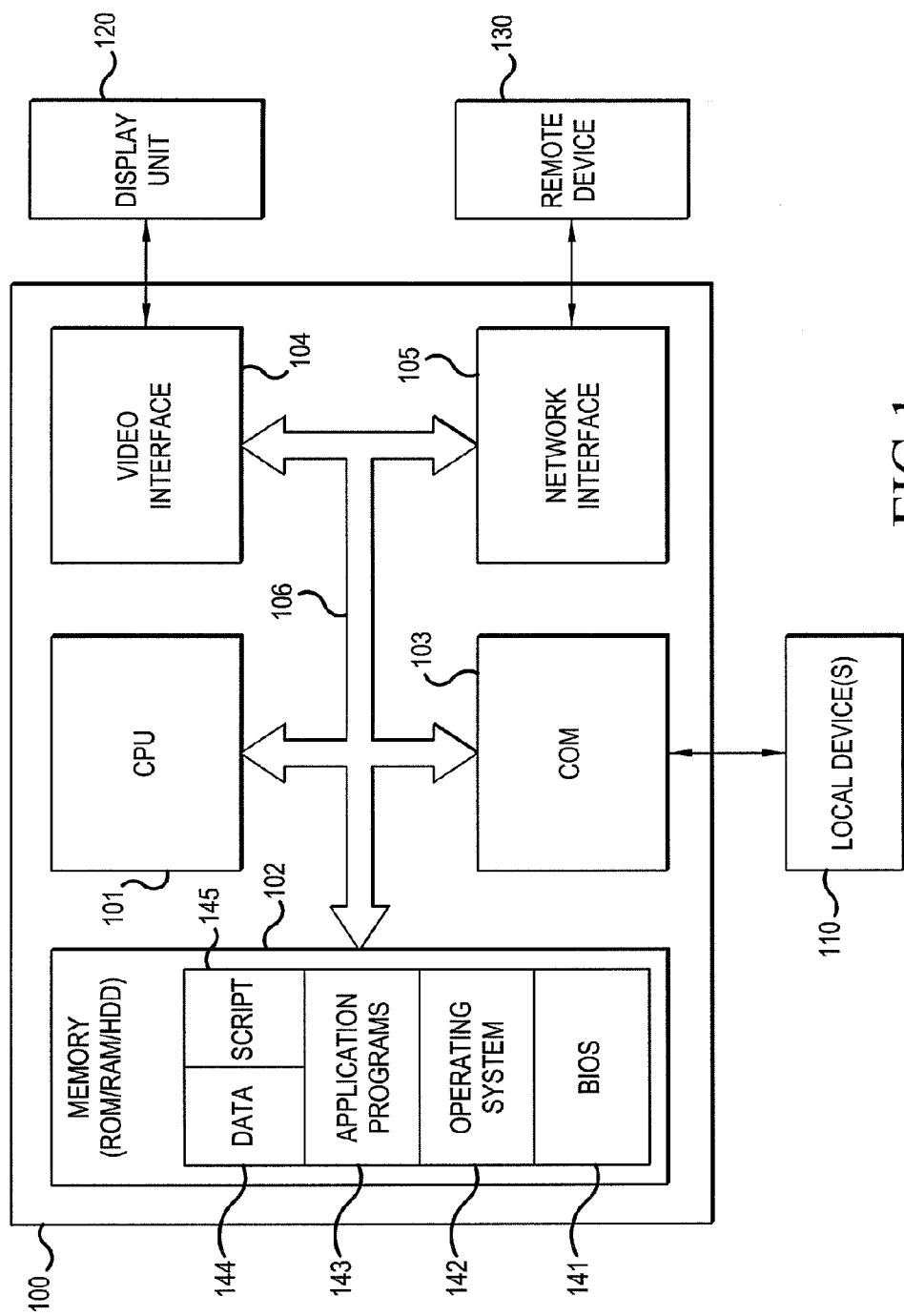
FIG. 1 is a computing device that can be used to implement an exemplary embodiment of the present invention.

FIG. 1 illustrates a generalized computing device 100 that can be used as an environment for implementing various aspects of the present invention. In FIG. 1, a device 100 has various functional components including a central processor unit (CPU) 101, memory 102, communication port(s) 103, a video interface 104, and a network interface 105. These components may be in communication with each other by way of a system bus 106.

The memory 102, which may include ROM, RAM, flash memory, hard drives, or any other combination of fixed and removable memory, stores the various software components of the system. The software components in the memory 102 may include a basic input/output system (BIOS) 141, an operating system 142, various computer programs 143 including applications and device drivers, various types of data 144, and other executable files or instructions such as macros and scripts 145.

The communication ports 103 may be connected to one or more local devices 110 such as user input devices, a printer, a media player, external memory devices, and special purpose devices such as e.g. a global positioning system receiver (GPS). Communication ports 103, which may also be referred to as input/output ports (I/O), may be any combination of such ports as USB, PS/2, RS-232, infra red (IR), Bluetooth, printer ports, or any other standardized or dedicated communication interface for local devices 110.

The video interface device 104 is connected to a display unit 120 which may be an external monitor or an integrated display such as an LCD display. The display unit 120 may have a touch sensitive screen and in that case the display unit 120 doubles as a user input device. The user input device aspects of the display unit 120 may be considered as one of the local devices 110 communicating over a communication port 103.

The network interface device 105 provides the device 100 with the ability to connect to a network in order to communicate with a remote device 130. The communication network, which in FIG. 1 is only illustrated as the line connecting the network interface 105 with the remote device 130, may be, e.g., a local area network or the Internet. The remote device 130 may in principle be any computing device with similar communications capabilities as the device 100, but may typically be a server or some other unit providing a networked service.

It will be understood that the device 100 illustrated in FIG. 1 is not limited to any particular configuration or embodiment regarding its size, resources, or physical implementation of components. For example, more than one of the functional components illustrated in FIG. 1 may be combined into a single integrated unit of the device 100. Also, a single functional component of FIG. 1 may be distributed over several physical units. Other units or capabilities may of course also be present. Furthermore, the device 100 may e.g. be a general purpose computer such as a PC, or a personal digital assistant (PDA), or even a cellphone or a smartphone.

Figure 2:
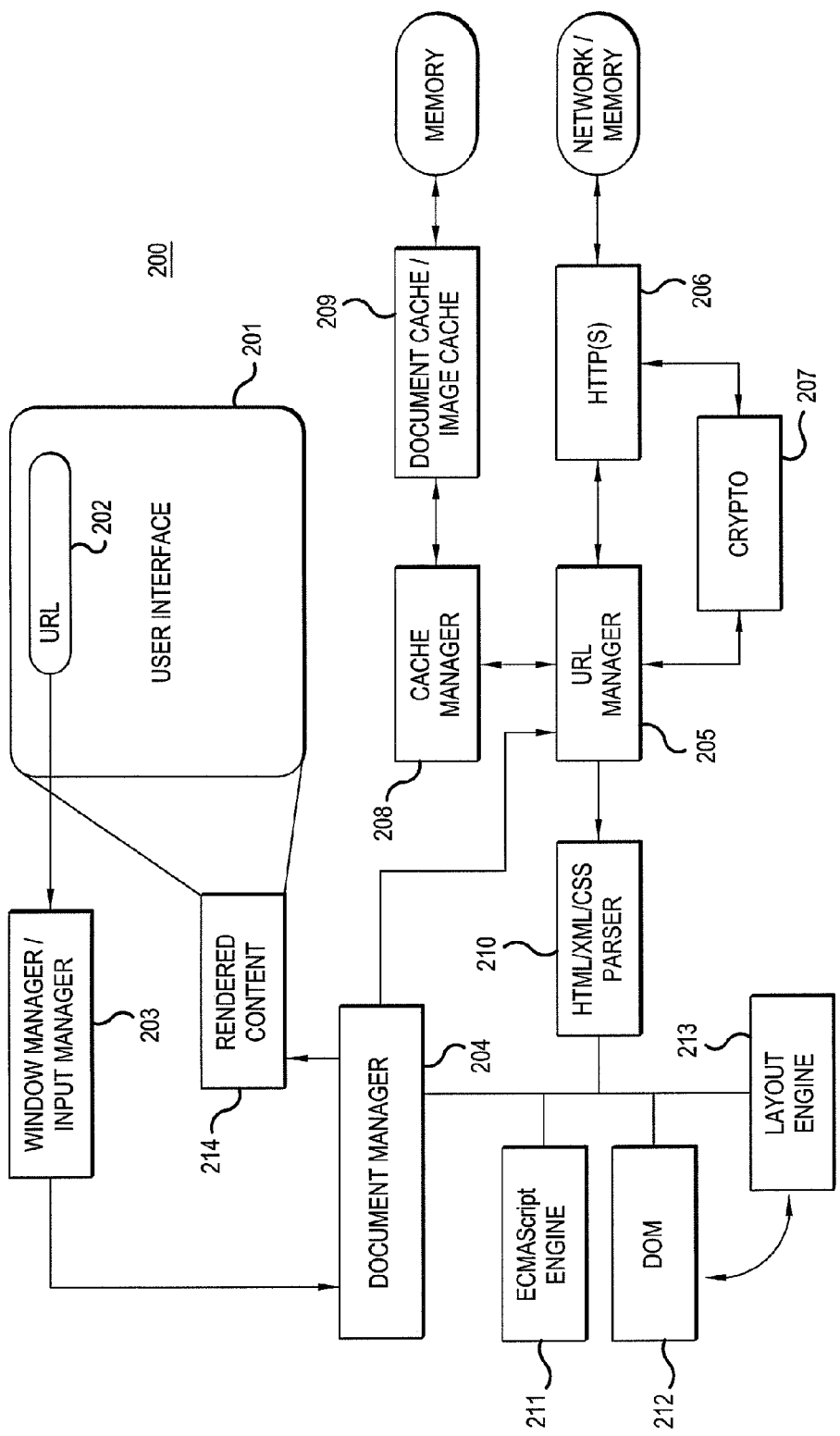
FIG. 2 is a user agent for accessing data resources in accordance with an exemplary embodiment of the present invention.

In an exemplary embodiment, various aspects of the present invention may be incorporated into, or used in connection with, the components and/or functionality making up a user agent or browser installed as an application on a device 100. FIG. 2 shows an example of a number of modules that may be present in such a user agent or browser. The modules will typically be software modules, or otherwise implemented by a programmer in software, and may be executed by the CPU 101. However, it is also possible for any of the modules of FIG. 2 to be implemented as hardware, a combination of hardware and software, or "firmware," as will be contemplated by those skilled in the art.

The user agent or browser 200 presents the user with a user interface 201 that may be displayed on the display unit 120 shown in FIG. 1. The user interface 201 may include an address field 202 where the user may input or select the URL of a document or a service he or she wants the user agent 200 to retrieve. For example, the user may use an input device (e.g., keyboard) to type in the URL in the address field 202. The address field 202 may also be a link that is displayed and may be activated by the user using a pointing device such as a mouse. Alternatively the URL may be specified in the code of a document or script already loaded by the user agent 200.

In any case, the URL may be received by a window and input manager 203 that represents the input part of the user interface 201 associated with, or part of, the user agent 200. The URL may then be forwarded to a document manager 204, which manages the data received as part of the document identified by the URL.

The document manager 204 forwards the URL to a URL manager 205, which instructs a communication module 206 to request access to the identified resource. The communication module 206 may be capable of accessing and retrieving data from a remote device 130 such as a server over a network using the hypertext transfer protocol (HTTP), or some other protocol such as HTTPS or FTP. The communication module 206 may also be capable of accessing data that is stored in local memory 102.

If communication outside the device 100 is required to be encrypted, e.g. as specified by the protocol used to access the URL, encryption/decryption module 207 handles communication between the URL manager 205 and the communication module 206.

The data received by the communication unit 206 in response to a request is forwarded to the URL manager 205. The URL manager 205 may then store a copy of the received content in local memory 102 using a cache manager 208 which administers a document and image cache 209. If the same URL is requested at a later time, the URL manager 205 may request it from the cache manager 208, which will retrieve the cached copy from the cache 209 (unless the cached copy has been deleted) and forward the cached copy to the URL manager 205. Accordingly, it may not be necessary to retrieve the same data again from a remote device 130 when the same URL is requested a second time.

The URL manager 205 forwards the data received from the communication port 206 or cache 209 to a parser 210 capable of parsing content such as HTML, XML and CSS. The parsed content may then, depending on the type and nature of the content, be processed further by an ECMAScript engine 211, a module for handling a document object model (DOM) structure 212, and/or a layout engine 213.

This processing of the retrieved content is administered by the document manager 204, which may also forward additional URL requests to the URL manager 205 as a result of the processing of the received content. These additional URL's may, e.g., specify images or other additional files that should be embedded in the document specified by the original URL.

When the data representing the content of the specified document has been processed it is forwarded from the document manager 204 in order to be rendered by a rendering engine 214 and displayed on the user interface 201.

The various modules thus described are executed by the CPU 101 of device 100 as the CPU 101 receives instructions and data over the system bus(es) 106. The communications module 206 communicates with the remote device 130 using the network interface 105. The functionality of various modules in FIG. 2 may of course be integrated into fewer larger modules. Also, the functionality of a single module in FIG. 2 may be distributed or replicated over several modules.

It will further be understood that, while the user agent 200 described above may be implemented as an application program 143, some of the user agent's 200 functionality may also be implemented as part of the operating system 142 or even the BIOS 141 of the device 100. The content received in response to a URL request may be data 144, script 145, or a combination thereof as further described below.

Figure 3:
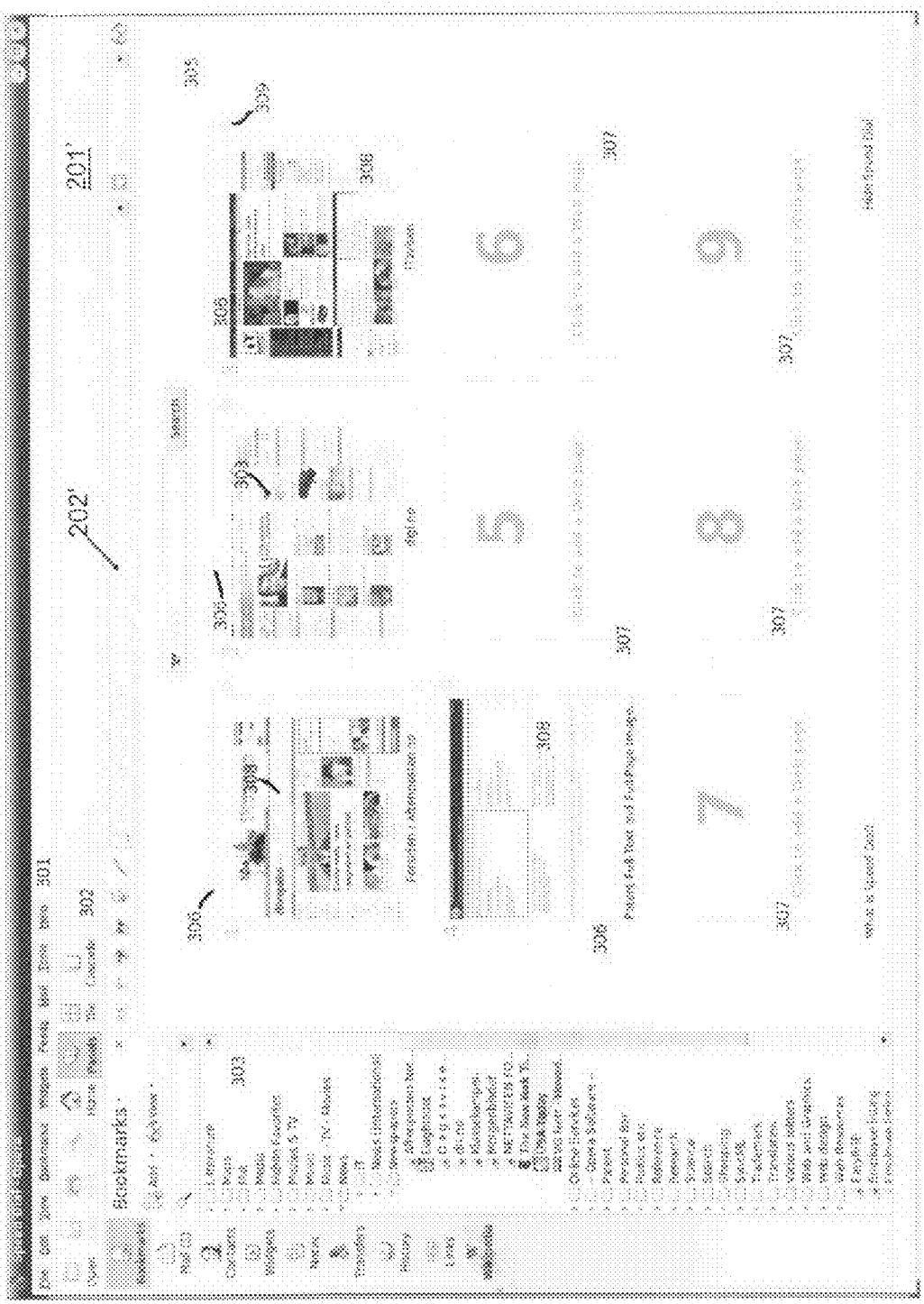
FIG. 3 is a user interface in accordance with an exemplary embodiment of the present invention.

Reference is now made to FIG. 3, which shows a view of a particular example of a user interface 201' of a web browser 200'. The user interface 201' according to this particular example includes a number of drop down menus 301, a number of buttons 302 that provide quick access to certain functions, a sidebar window 303 showing a bookmark list, an address field 202', and a main window 305.

The bookmark list in the sidebar window 303 is a list of web resources organized hierarchically according to categories. A user may access a particular web resource, e.g., the web page of a newspaper, by first clicking on the folder marked "News," then on the folder marked "Newspapers", and finally on the bookmark representing the particular newspaper he or she wants to access. The browser 200' will then access the web site, retrieve the information associated with it and display a rendered version of the newspaper web site, as described above with respect to FIG. 2.

However, certain web sites may be accessed particularly often, and it is inefficient for the user to have to navigate through a hierarchically organized list every time such a site is desired. According to an embodiment of the present invention, when an empty browser window is opened, a representation of a plurality of favorite web pages may be represented, e.g., as thumbnails (i.e., small images that represent a scaled down version of the actual web page). This is illustrated by way of an example in FIG. 3, where the main window 305 contains nine locations 306, 307 reserved for such representations. Specifically, reference number 306 refers to the locations of four thumbnail representations 308 of four different web pages, while the five remaining locations 307 are still empty.

When a user selects a web resource and associates it with one of the locations 306, 307 in the main window 305, the URI of the resource is stored, e.g., in a configuration file where a list of selected web sites is maintained. If a web page was already associated with the selected location 306, the previously stored URI may be replaced by a new URI.

When the identified resource is loaded by the browser 200', a thumbnail representation 308 of the rendered page may be created and stored as an image file, e.g., in a cache memory maintained by the browser 200'. In accordance with an embodiment consistent with the principles of the invention, the image files may be stored in a document and image cache 209 in local memory 102 as already described. Alternatively, the image files may be stored and administered separately from other cached elements.

The loading, rendering and thumbnail creation may be performed when the URI of the resource is first stored, the first time the user requests the resource to be loaded, or according to some other rule, e.g., at periodic intervals. Such alternatives may be part of the design criteria implemented when creating the web browser 200', or they may be available as configuration options to the user.

The stored thumbnail image 308 must be associated with the proper location 306, 307 in the main browser window 305. Several alternatives are within the scope of the invention. By way of example, an identification of the thumbnail image 308 may be entered in the list that also contains the URI of the associated web site. Alternatively, there may be a direct association between each location 306, 307 and a particular image file, which is updated every time the thumbnail image 308 changes. If no URI has been stored for a particular location 307, a default image may be used. Alternatively, some other type of user interface element may be used, for instance, a user element containing text.

In addition to the thumbnail image 308, each location 306, 307 may include additional user interface elements 309. These elements may represent additional user invocable functions such as "reload," "clear," etc.

According to an embodiment consistent with principles of the present invention, the main window 305 and the various locations 306, 307 and elements 308, 309 thereof may be hierarchical user interface elements. The main window 305 (or the user interface element displayed in the main window 305 when the invented method is invoked) is a user interface element at a first level. The various locations 306, 307 may be user interface elements subordinate to the main window element, and the various parts of the locations 306, 307 (such as thumbnail images 308 and user controls 309) may again be subordinate to the locations 306, 307.

It will be realized by those with skill in the art that this organization of user interface elements is similar to that which is common in the chrome (i.e., the borders and widgets that frame the content part of a "window") of a user interface. As an example, the buttons 302 may be subordinate to a "main bar" user interface element which, if hidden, results in the hiding of all the buttons 302.

According to one embodiment consistent with the principles of the invention, the locations 306, 307 are thumbnail widgets. Generally speaking, a widget is an interface element that a computer user interacts with. Widgets may sometimes be thought of as small, dependent computer programs (applets) that are displayed by a host software system (widget engine), which may be part of a window manager system or a web browser, or a standalone application. According to the present invention, the functionality of the web browser 200' may be used to display the thumbnail widgets.

Figure 4:
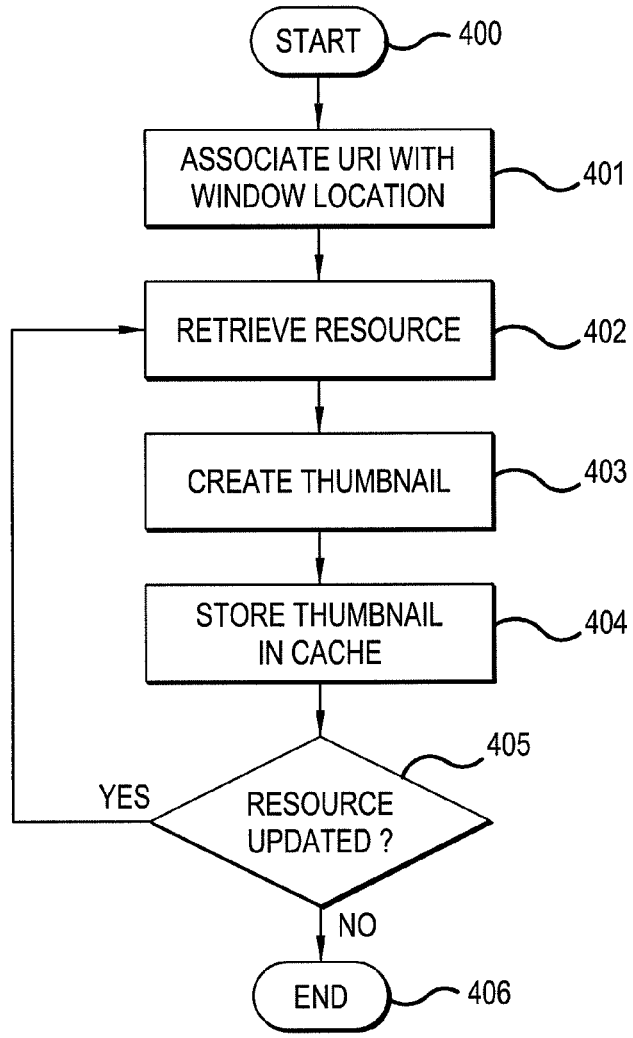
FIG. 4 is a flow chart illustrating how a data resource can be associated with a display location in accordance with an exemplary embodiment of the present invention.

Reference is now made to FIG. 4, which is a flowchart illustration of how, according to one embodiment of the invention, the process of associating a web resource with a location 306, 307 and generating a thumbnail image may be performed.

The process starts according to step 400. In step 401, a user associates a URI with a particular location 306, 307 in the browser window 305. According to one embodiment, the user does this by opening a dialog box (e.g., by clicking on an empty location 307 or by choosing to edit a location 306 that has already been assigned a URI) and entering the URI. According to an alternative embodiment, the user drags a representation of the web site to the appropriate location 306, 307 using a mouse or some other pointing device, and drops it there. The representation may be, e.g., an icon displayed in the address field 304 of a different browser window (not shown) and representing a page loaded in that window, or a tab (not shown) representing a different main window open in the same browser window but hidden behind the current main window 305 displaying the various locations 306, 307.

After an URI has been associated with a location 306, 307 in the browser window, the browser 200' retrieves the referenced resource in step 402. When the resource (e.g., a web page) has been retrieved, the thumbnail 308 is created 403. This can be done by rendering the page internally, without actually displaying it on the display 120 of the device 100. From the internally rendered document, an image file may be created. The image file may be a file with any image file format (such as JPG or PNG) preferred based on design criteria.

The image file is then stored in cache memory in step 404. The cached image file may be handled according to regular caching operation as described with reference to FIG. 2. Alternatively, in order to reduce the number of reloads of the files used to create the image thumbnail 308, the reload operation may be restricted. According to some embodiments, thumbnails 308 are cached indefinitely, but updated when one of the following occur: the user visits a page for which there is a thumbnail 308 in cache, but the page has expired according to the browser's 200' caching policy; a reload is forced through user interaction (a reload button or context menu); and application of a rule scheduling regular reloads.

As an alternative to the generated thumbnail images 308, according to various embodiments, the entire web page may be cached, and the thumbnail representation 308 may a frame in which a reduced-size version of the cached web page is displayed. In this case the step 403 of generating the thumbnail 308 may be omitted, since instead of a thumbnail image 308, the actual content files of the web page are cached.

If any of the web sites or resources represented as a thumbnail 308 are scheduled for regular reloads 405, the browser 200' will wait until the reload is scheduled to occur, and then retrieve the resource again in a return to step 402.

The reload operation according to step 405 may depend on whether any headers associated with the remote resource indicates that the resource actually has been updated. If a newer version of the resource exists in the web browser's regular cache because a user has surfed to the resource since the thumbnail was created, the cached version may be used instead of a new reload.

It will be understood that the browser 200' may perform other tasks while it is waiting to reload a resource (between steps 404 and 405), and indeed while performing any other of the tasks illustrated in FIG. 4.

If none of the resources are scheduled to be reloaded, processing may end in step 406.

Returning to FIG. 3, the actual page displayed in the window 305 must be generated. According to one embodiment, this page is an HTML document that is loaded automatically as a default page when the user instructs the browser to open a new empty browser window 305. Alternatively, this page may be an HTML document that is automatically loaded into a current window 305 in response to a user input, e.g., clicking a link or button in the current window 305. Such a document may contain references to the various elements on the page, including the thumbnails 308 and any files containing URIs.

According to an alternative embodiment, the page is generated natively in the code of the browser 200'. For instance, the browser 200' may be designed to generate this page automatically when a new empty browser window 305 is opened, or when a particular input is received from the user.

Further, exemplary embodiments of the invention may be implemented as part of a "speed dialing" function of a user agent 200 or web browser 200'. For example, in one such embodiment, each thumbnail 308 and resource may be associated with a number. Accordingly, the user may provide a number-based input to select a thumbnail image 308 and corresponding resource. For instance, the browser 200' or user agent 200 may then be configured to load the resource and display it if the user enters the number in the browser's address field 304. The number may also be part of a particular keystroke or keystroke combination. As an example, the browser 200' may be configured to load the resource associated with "1" in the thumbnailed page if the user hits the key combination CTRL+1.

In another "speed dialing" embodiment of the invention, each location 306, 307 may be associated with a number regardless of whether a thumbnail image 308 is displayed at that location 306, 307. This is consistent with the example shown in FIG. 3, where the various locations 306, 307 are associated with the numbers 1-9 (i.e., thumbnails 308 are displayed at the locations 306 respectively associated with digits 1-4, while no thumbnails 308 are yet displayed at the locations 307 respectively associated with digits 5-9). For example, if the user were to type the key combination CTRL+3, the resource displayed at the location 306 associated with "3" is retrieved. However, in this example, if the user were to type CTRL+6, the user may simply be given the option of inputting the URI of a resource to be displayed since the location 307 associated with "6" does not yet display a thumbnail 308.

Regardless of whether numbers are associated with respective thumbnails 308 or locations 306, 307, such "speed dialing" embodiments offer the user functionality similar to the speed dialing function of a telephone. Whereas the phone speed dialing function allows the user to make a call using a simple one- or two-digit number rather than dialing the entire phone number, the above-described "speed dialing" embodiments may allow a user to use a simple number to retrieve a data resource (e.g., web page) rather than typing in the corresponding URI.

According to various embodiments of the invention, a browser 200' may be configured to allow drag and drop functionality. Such functionality may be associated with different representations of a web resource, e.g., an icon representing a loaded resource, a resource in a bookmark list 303, or a resource that is open in a different tab (if the browser supports tabbed browsing). If a user uses a pointing device (e.g. a mouse) to drag any such representation of a web resource to one of the locations 306, 307 and drops it there, that resource may become associated with that location 306, 307. If a resource is already associated with that location 306, 307, the old resource may be replaced by the new resource, possibly after the user is asked to confirm.

While particular embodiments are described above for purposes of example, the present invention covers any and all obvious variations as would be readily contemplated by those skilled in the art.

The invention claimed is:

1. A method for providing access to data resources using a web browser, comprising:
    maintaining a list of data resources;
    associating each data resource in said list with one of a plurality of predefined locations in a content part of a browser window which is framed by the browser's chrome;
    maintaining, in computer memory, graphical representations of each data resource in said list; and
    when a user instructs a web browser to open an empty browser window:
        opening a new browser window as instructed by the user, and displaying the opened browser window including the predefined locations in the content part, and
        for each data resource in said list, displaying a corresponding thumbnail image in the associated predefined location in the content part of the opened browser window such that the thumbnail images that correspond to the data resources in said list are simultaneously displayed, wherein
    wherein each displayed thumbnail image is generated based on the graphical representation of the corresponding data resource, and
    each displayed thumbnail image is associated with a user invocable instruction for retrieving and displaying the corresponding data resource.

2. The method of claim 1, further comprising:
    receiving user input requesting a particular data resource;
    retrieving said requested data resource;
    storing a graphical representation of said requested data resource in said computer memory;
    adding said requested data resource to said list; and
    generating a thumbnail image based on said graphical representation of said requested data resource, said thumbnail image to be displayed in an associated one of the predefined locations of said browser window.

3. The method of claim 1, wherein said list contains a Uniform Resource Identifier (URI) for each data resource in said list.

4. The method of claim 2, wherein said graphical representation of said requested data source is an image file generated from a rendering of said requested data resource.

5. The method of claim 2, wherein said graphical representation of said requested data resource is a cached version of said requested data resource and said thumbnail image is a reduced size rendering of said cached version.

6. The method of claim 1, wherein said user invocable instruction is a mouse click.

7. The method of claim 1, wherein said user invocable instruction is a keystroke combination uniquely associated with one of said predefined locations.

8. The method of claim 2, wherein said user input is a user entry of a Uniform Resource Identifier (URI).

9. The method of claim 2, wherein said user input is drag and drop operation performed with a pointing device, the drag and drop operation being performed by dragging an icon representing said requested data resource and dropping the dragged icon at one of said defined predefined locations.

10. A non-transitory computer readable medium on which is embodied a computer program for providing access to data resources using a web browser, the computer program comprising computer executable instructions for:
    maintaining a list of data resources;
    associating each data resource in said list with one of a plurality of predefined locations in a content part of a browser window which is framed by the browser's chrome;
    maintaining, in computer memory, graphical representations of each data resource in said list; and
    when a user instructs said web browser to open an empty browser window:
        opening a new browser window as instructed by the user, and displaying the opened browser window including the predefined locations in the content part, and
        for each data resource in said list, displaying a corresponding thumbnail image in the associated predefined location in the content part of the opened browser window such that the thumbnail images that correspond to the data resources in said list are simultaneously displayed, wherein each displayed thumbnail image is generated based on the graphical representation of the corresponding data resource, and associating each displayed thumbnail image with a user invocable instruction for retrieving and displaying the corresponding data resource.

11. The computer readable medium of claim 10, the computer program further comprising computer executable instructions for:

receiving user input requesting a particular data resource;

retrieving said requested data resource;

storing a graphical representation of said requested data resource in said computer memory;

adding said requested data resource to said list; and generating a thumbnail image based on said graphical representation of said requested data resource, said thumbnail image to be displayed in an associated one of the predefined locations of said browser window.

12. The computer readable medium of claim 10, wherein said list contains a Uniform Resource Identifier (URI) for each data resource in said list.

13. The computer readable medium of claim 11, wherein said graphical representation of said requested data resource is an image file generated from a rendering of said requested data resource.

14. The computer readable medium of claim 11, wherein said graphical representation of said requested data resource is a cached version of said requested data resource and said thumbnail image is a reduced size rendering of said cached version.

15. The computer readable medium of claim 10, wherein said user invocable instruction is a mouse click.

16. The computer readable medium of claim 10, wherein said user invocable instruction is a keystroke combination uniquely associated with one of said predefined locations.

17. The computer readable medium of claim 11, wherein said user input is a user entry of a Uniform Resource Identifier (URI).

18. The computer readable medium of claim 11, wherein said user input is drag and drop operation performed with a pointing device, the drag and drop operation being performed by dragging an icon representing said requested data resource and dropping the dragged icon at one of said defined predefined locations.

* * * * *